United States Patent [19]

Takada

[11] Patent Number: 5,791,645
[45] Date of Patent: Aug. 11, 1998

[54] SIMPLE INVERTING PATH FOR AN AUTO DOCUMENT FEEDER FOR AN IMAGE FORMING APPARATUS

[75] Inventor: Hiromi Takada, Yokohama, Japan

[73] Assignee: Ricoh Company, Ltd., Tokyo, Japan

[21] Appl. No.: 613,623

[22] Filed: Mar. 11, 1996

[30] Foreign Application Priority Data

Mar. 10, 1995 [JP] Japan .................. 7-050684

[51] Int. Cl.$^6$ .................................. B65H 5/22
[52] U.S. Cl. .............. 271/3.03; 271/4.07; 271/186; 271/305; 399/373; 399/374; 399/401
[58] Field of Search ............... 271/3.03, 4.05, 271/4.07, 4.08, 4.1, 291, 298, 301, 305, 186; 399/401, 364, 369, 373, 374; 355/319, 320

[56] References Cited

U.S. PATENT DOCUMENTS

| | | | |
|---|---|---|---|
| 4,639,125 | 1/1987 | Okuda et al. | 271/301 |
| 4,714,241 | 12/1987 | Randall | 271/3.03 |
| 4,777,511 | 10/1988 | Takahashi | 399/374 |
| 4,990,965 | 2/1991 | Kiya | 271/186 |

FOREIGN PATENT DOCUMENTS 7-64359   3/1995   Japan .

*Primary Examiner*—H. Grant Skaggs
*Attorney, Agent, or Firm*—Oblon, Spivak, McClelland, Maier & Neustadt, P.C.

[57] ABSTRACT

A document setting tray of the ADF is disposed above a platen glass of an image forming apparatus. A duplex document ejecting tray is disposed above a document setting tray. A switch back table, on which the duplex document is switched back after one side thereof has been read by the reading device and fed again toward the image reading device, is disposed between the document setting tray and the duplex document ejecting tray. A switch back return path is disposed between the reading position of the image reading position and the switch back table.

6 Claims, 8 Drawing Sheets

SIMPLE INVERTING PATH FOR AN AUTO DOCUMENT FEEDER FOR AN IMAGE FORMING APPARATUS

BACKGROUND OF THE INVENTION

Field of the Invention

The present invention relates to an improvement of an auto document feeder (ADF) for feeding a duplex document having images on both sides thereof for an image forming apparatus, for example, a copier, a facsimile machine, a printer, and so on.

Description of the Background Art

In a background Auto Document Feeder (hereinafter ADF) for an image forming apparatus, for example, as shown in the specification of the Japanese Laid Open Patent Application No. 2-8145/1991, an inverting path for inverting and further transferring a duplex document to a reading position is disposed outside of a width of a platen glass and above a document setting tray.

However, such a background ADF unavoidably becomes bulky, because the inverting path is disposed outside the recycle path of the document. Further, the transportation path extending from an inverting tray to a reading position, where a next reading of a next page of the document is executed, becomes longer, because the document having been inverted is transferred by a long distance and is finally led to the reading position.

SUMMARY OF THE INVENTION

Accordingly, one object of the present invention is to provide a novel document feeding system which overcomes drawbacks in the background devices.

According to the present invention, a duplex copy is made in order of pages from the duplex document having images on both a front side and rear side. And further, the transferring path for the duplex document along with the reading position is minimized. Thereby, the time for transportation of the document is minimized and the interval of the reading of the images of the documents is minimized in the present invention.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
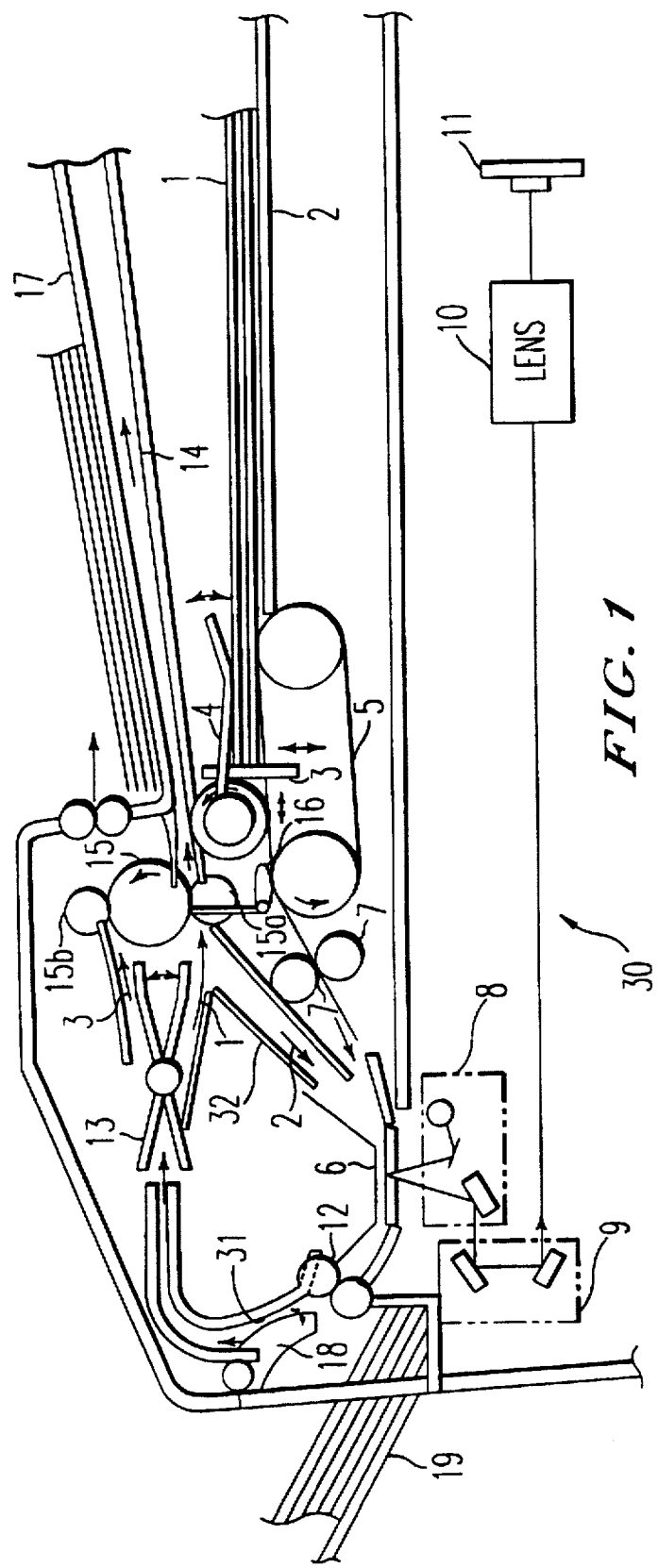
FIG. 1 is a sectional view of a recycle ADF for a duplex document while being transferred through a reading position employed in the present invention.

Referring now to the drawings, wherein like reference numerals designate identical or corresponding parts throughout the several views, the embodiments of the present invention are disclosed hereinafter.

Figure 2:
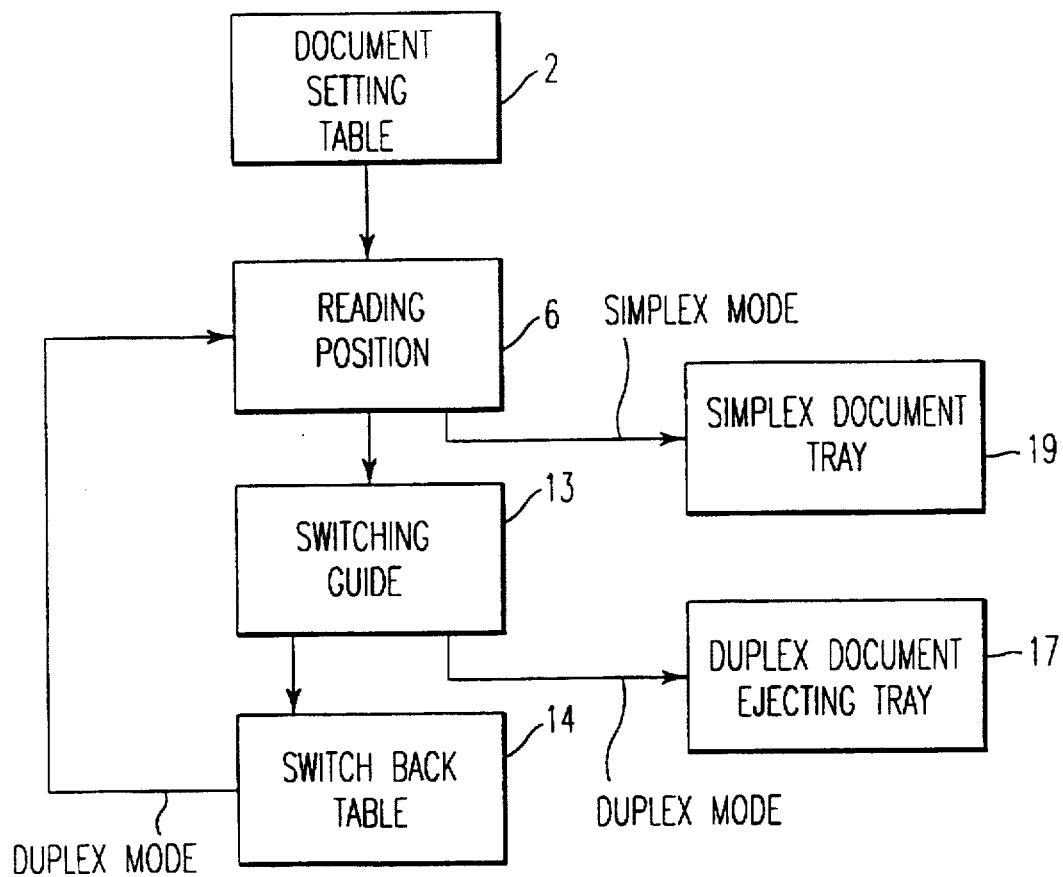
FIG. 2 is a block diagram showing the document flow in the path of the recycle ADF of the first embodiment of the present invention.
Figure 3A:
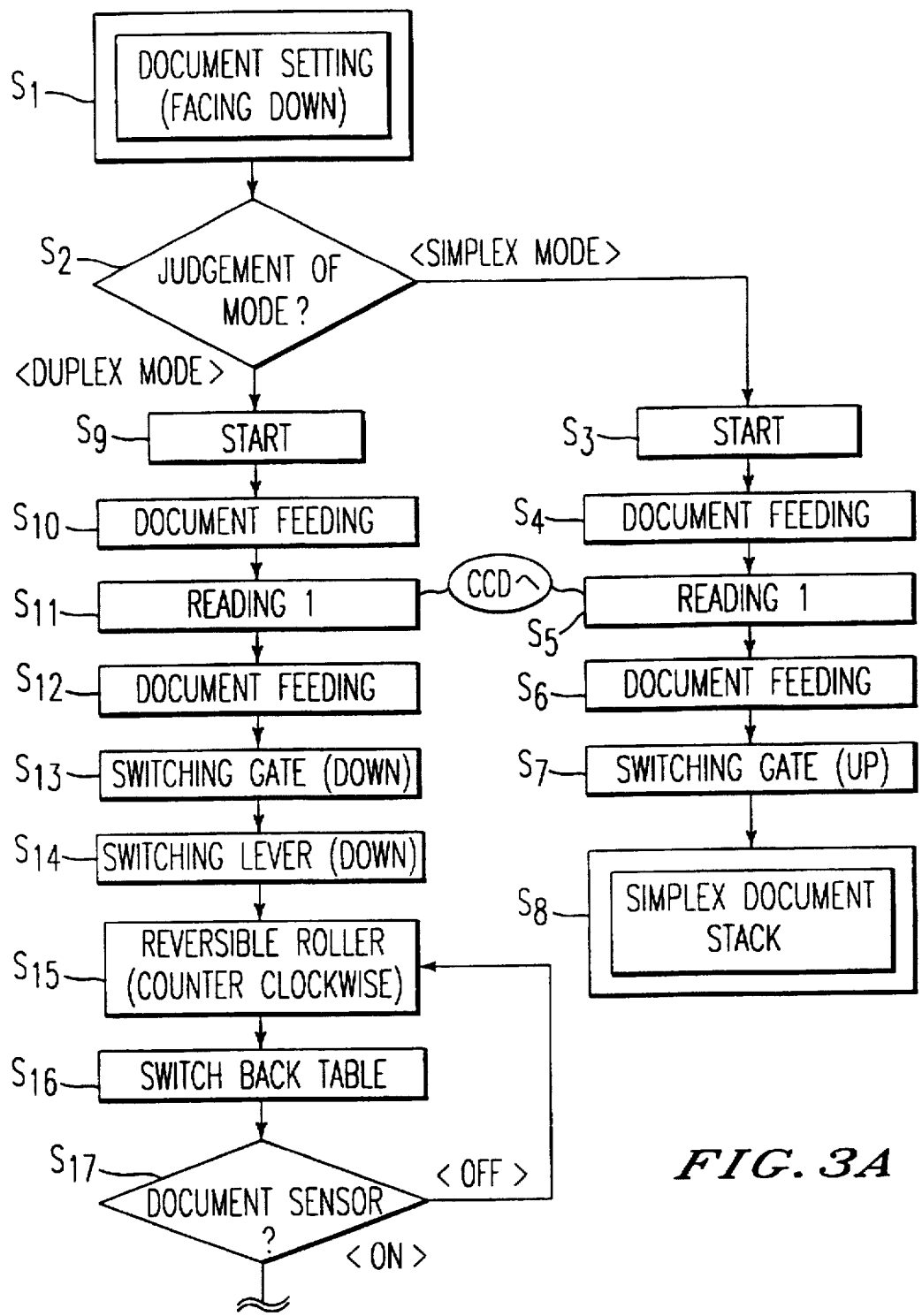
FIG. 3 is a flow chart showing the steps of the transportation of the document and reading of the documents of the present invention.
Figure 3B:
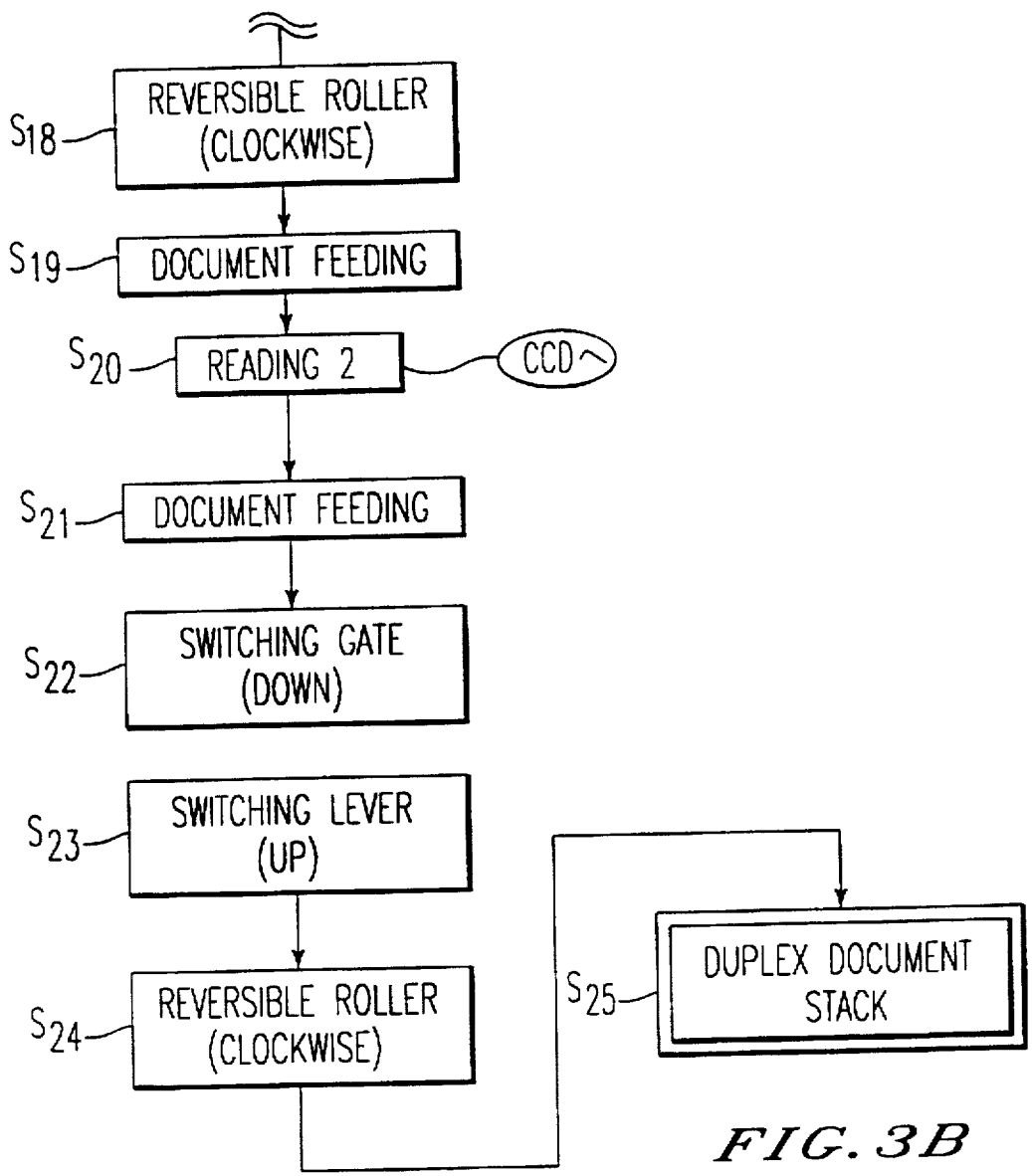

The drawings of FIGS. 1, 2 and 3 show a first embodiment of the present invention. The auto document feeder (hereinafter ADF) may be of a type where the ADF is mounted on an image forming apparatus.

As shown in FIGS. 1 and 2, an original document setting table 2 is disposed in the ADF and documents 1 having images formed on both of front and rear sides thereof are set thereon in a state that the first page faces down. A stopper 3 is disposed at one edge of the document table 2 so that the stopper 3 inhibits feeding of the documents 1 set on the table 2. A pick up lever 4 is disposed above the document table 2 so that the lever 4 presses the documents 1 stacked on the table 2. A pick up belt 5 is disposed below the table 2.

When a document reading is initiated, the stopper 3 is withdrawn to a position below the table 2 and the pick up lever 4 lowers the document stack so that the documents 1 contact the pick up belt 5. Thereby the first page of the documents 1 is separated by the pick up belt 5 and is fed toward the reading position 6 as shown in FIG. 1.

A feeding roller 7 is disposed between the table 2 and the reading position 6 and feeding roller 7 feeds the separated page of the document 1 at a predetermined speed toward the reading position 6. The first page of the document 1 is read during passing through the reading position 6 in a manner of a conventional sheet through scanning method. An optical device is composed of a first carriage 8 and a second carriage 9. In the first carriage 8 and the second carriage 9, a lamp and mirrors are disposed therein. Thereby the light beam reflected from the document 1 is further reflected by the mirrors. The first and second carriages 8, 9 may be connected with each other as a unit. A lens 10 and a CCD sensor 11 are disposed so that the beam reflected by the mirrors is focused on the CCD sensor 11. Accordingly, the carriages 8, 9, the lens 10 and CCD sensor 11 compose a document reading device 30. And the reading device 30 is disposed in the image forming apparatus.

A pair of rollers 12 is disposed at a downstream position of the reading position 6. An ejecting path 31 is disposed at a downstream position of the ejecting rollers 12. Thereby, a duplex mode, where a duplex copy is made, is set by an operator and the document having images formed on both front and rear sides is set on the table 2. The document 1, the front side of which has been already read at the reading position 6, is further fed by the ejecting rollers 12 through the ejecting path 31 to the position above the table 2 in the state that the copied face of the document is now upside down.

A switching guide 13 is disposed at a downstream position of the ejecting path 31. A duplex document ejecting tray 17 is disposed above the table 2. Further, a switch back table 14 is disposed between the table 2 and the duplex document ejecting tray 17. Thereby, the switching guide 13 selectively changes an angle thereof to lead the document either to the duplex document ejecting tray 17 or to the switch back table 14.

A reversible roller 15 is disposed at a downstream position of the switching guide 13. Follower rollers 15a and 15b are disposed each around the reversible roller 15 by contacting the periphery thereof.

Thereby, if the switching guide 13 is swung clockwise toward the switch back tray 14, the reversible roller 15 rotates clockwise so that the document is further fed to the switch back table 14 by cooperation of the follower roller 15a. To the contrary, if the switching guide 13 is swung counterclockwise toward the duplex document ejecting tray 17, the roller 15 rotates clockwise to feed the document to the tray 17 by cooperation of the follower roller 15b.

A sensor 16 is disposed adjacent to the reversible roller 15. A switch back returning path 32 is disposed below the switching guide 13 and between the reversible roller 15 and the reading position 6. Thereby, if the trailing edge of the document is detected by the sensor 16, the reversible roller 15 starts to rotate clockwise so that the document existing on the switch back tray 14 is transferred by both the reversible roller 15 and the follower roller 15a and is forwarded toward the switch back returning path 32.

A switching gate 18 is swingably disposed at a downstream position of the ejecting rollers 12. Further, a simplex document tray 19 is provided on which a simplex document is ejected. In the case the simplex mode is set, in which a single sided copy is made from a document having an image only on one side thereof, the switching gate 18 enters to the path 31. Thereby, the document is read by the optical device at the reading position 6 and is ejected by the ejecting rollers 12, and then the simplex document is guided by the switching gate 18 and is led to the simplex document tray 19.

Hereinafter, the flow of the transportation of the document is explained in detail referring to FIG. 3. In step S1, the stack of the document 1 is set in the state that the first side (first page) is facing down. In step S2, the transportation mode is set depending on the type of the document, namely simplex or duplex. In step S3, when the simplex mode is judged, the start switch is depressed, thereby the stopper 3 is withdrawn to the position below the original table 2 to allow the document to pass therethrough and the pick up lever 4 pushes the documents from an upper side toward the original table 2. Therefore, the first sheet of the document 1 is separated and fed toward the reading position 6 by the pick up belt 5.

In steps S4 and S5, the document 1 is transferred by the feeding roller 7 and one side of the document is read by the reading device 30 disposed at the reading position 6. After document feeding in step S6, as the transportation mode is the simplex mode, the switching gate 18 enters to the path 31, see step S7. Thereby, after a front side of the document has been read by the reading device 30 and is ejected by the ejecting rollers 12, the document is led to the simplex tray 19 through the gate 18 in the state that the first side of the document is facing down, see step S9.

On the other hand, if the document is duplex and the duplex transportation mode is set in step S2, in steps S9 and S10 the start switch is depressed and the lower most sheet of the documents 1 is separated and fed toward scanning position 6. In steps S11 and S12, the front side of the document 1 is read by the reading device 30 and is further fed by the ejecting rollers 12 upwardly. Thereby, the side of the document already read by the reading device 30 is facing up and, to the contrary, the side of the document not yet having been read is facing down in the path 31.

In step S13, the switching gate 18 is swung clockwise from the path 31 so that the entrance to the simplex tray is closed and the document is transferred through the path 31 toward the switching lever 13. In step S14, the switching lever 13 is swung clockwise so that the document 1 is fed toward the switch back table 14 by both the reversing roller 15 and the follower roller 15a.

In steps S15 and S16, the reversible roller 15 is rotated counterclockwise and the document 1 is fed toward the switch-back table 14 in the state that the side of the document already read is facing up and the side not yet having been read is facing down. In steps S17, S18, S19 and S20, when the trailing edge of the document is detected by the sensor 16, see step S17, the reversible roller 15 starts rotating clockwise, see step S18, and feeds the document toward the reading position 6 through the switch back return path 32, see step S19. After that the next reading by the reading device 30 for the rear side of the document facing down is executed by feeding the document through the reading position 6, see step S20.

In step S21, the duplex document, both surfaces of which have now been read, is further fed toward the ejecting roller 12. Before the document is further fed by the ejecting rollers 12, in steps S22 and S23, the switching lever 18 is swung around the pin thereof counterclockwise so that the entrance to the simplex tray 19 is inhibited. And further, the switching lever 13 is also swung counterclockwise so that the document fed from the ejecting rollers 12 is led between the reversing roller 15 and the follower roller 15b.

In steps S24 and S25, the reversible roller 15 starts rotating clockwise and feeds the document to the duplex tray 17. Thereby the document is ejected and stacked in the state that the first side of the document is facing down, and thereby the documents are stacked in order of the pages thereof.

Figure 5:
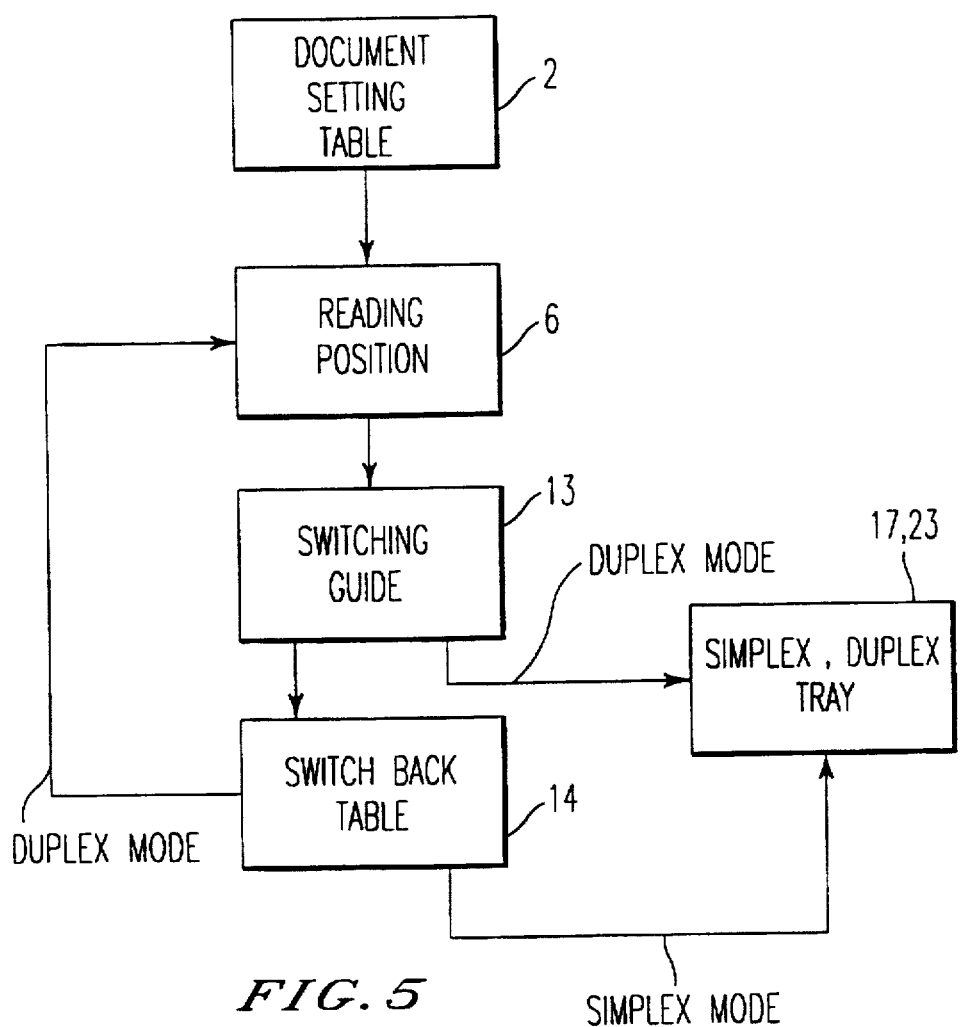
FIG. 5 is a block diagram showing the document flow in the path of the recycle ADF of the further embodiment of the present invention.
Figure 6A:
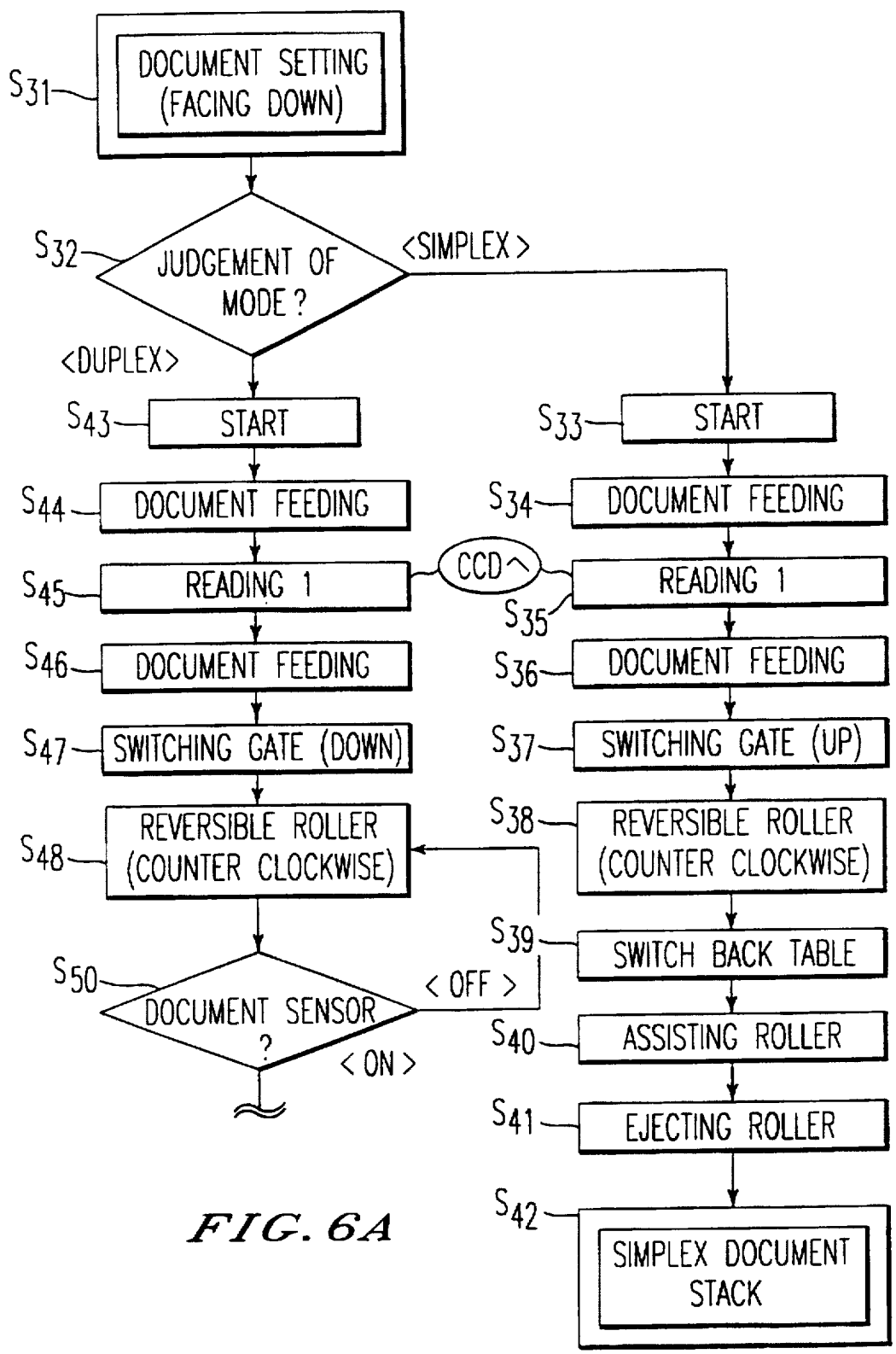
FIG. 6 is a flow chart showing the steps of the transportation of the document and reading of the documents of the further embodiment of the present invention.
Figure 6B:
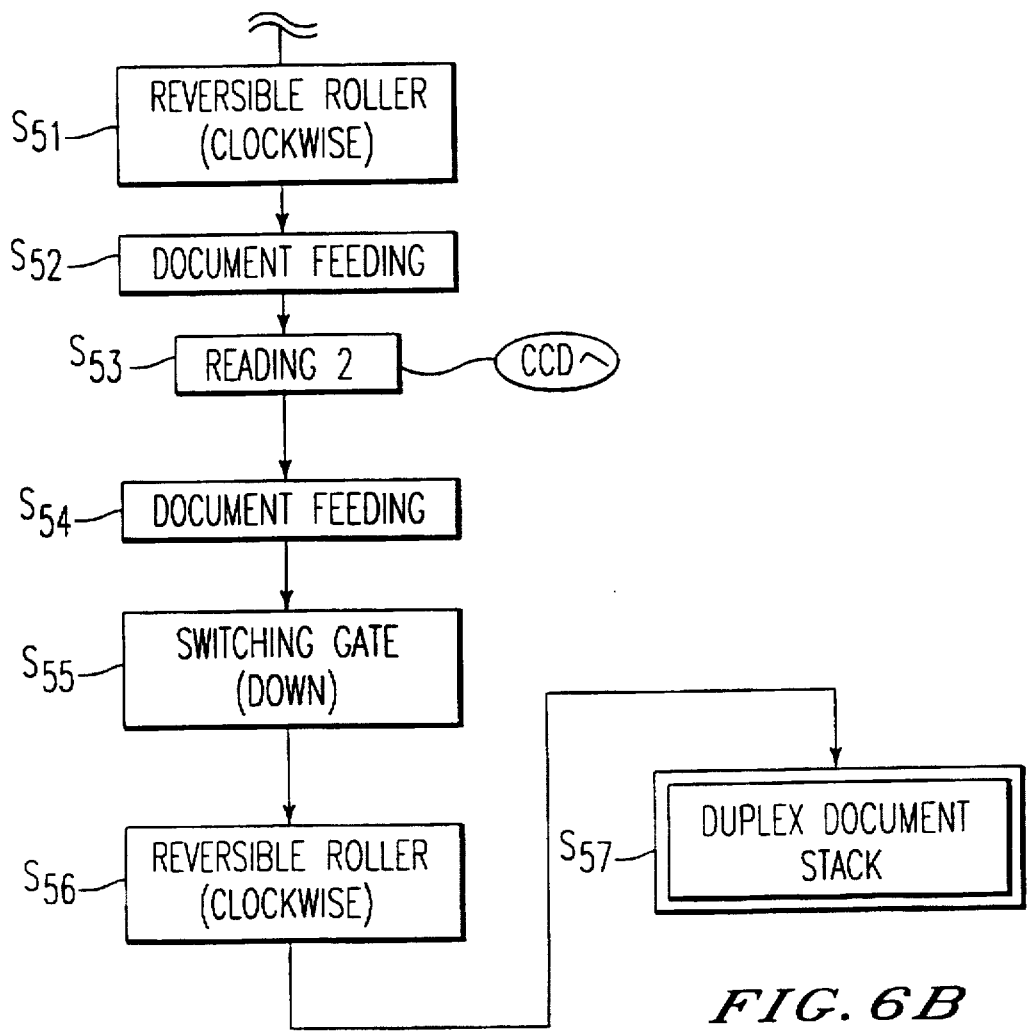

Hereinafter, the second embodiment of the present invention is described in detail referring to FIGS. 4, 5 and 6. The difference between the first and second embodiments is as follows. The switching lever 18 is omitted in the second embodiment and the simplex tray 19 is disposed beside the duplex tray of the first embodiment as mentioned below.

In the second embodiment of the present invention, an assisting roller 21 is disposed in the switch back table 14 and which rotates counterclockwise. A simplex document tray 23 is disposed beside the duplex tray 17 and is unitedly connected therewith. A second ejecting roller 22 is disposed at the edge of the switch back table 14 and which rotates counterclockwise to feed the document to the simplex document tray 23. And further, an inverting path 14a is disposed between the switch back table 14 and the simplex document tray 23, so that it turns the document upside down.

Hereinafter, the transportation flow of a document in the second embodiment is explained in detail referring to FIG. 6.

In step S31, the stack of the document is set in the state that the side having images is facing down. In step S32, the transportation mode is set depending on the type of the document, namely simplex or duplex. If the mode is simplex, and the start switch is depressed in step S33, the stopper 3 is withdrawn to a position below the original table 2 to allow the document 1 to pass therethrough and the pick up lever 4 pushes the documents from an upper side toward the bottom. Therefore, the first sheet of the document 1 is separated and fed to the reading position 6 by the pick up belt 5.

In steps S34 and S35, the document 1 is fed in a constant speed by the feeding roller 7 and is further fed to the reading position 6, so that the document is read by the reading device 30 at the reading position 6. In steps S36 and S37, the switching lever 13 rotates clockwise to make a path toward the switch back table 14. Thereby, the document having been read is led to the table 17 through the lever 18 and the gap between the rollers 15 and 15a in steps S38, S39.

In steps S40, S41 and S42, the document fed by the reversing roller 15 is further fed by both the assisting roller 21 rotating counterclockwise and the inverting roller 22 also rotating counterclockwise through the inverting path 14a toward the simplex tray 23.

On the other hand, if the document is duplex, the duplex transportation mode is judged in step S32. In steps S43 and S44, the start switch is depressed and the lowermost duplex document is separated and fed toward reading position 6. In steps S45 and S46, the first side of the document 1 is read by the reading device 30 and is further fed by the ejecting rollers 12 upwardly. Thereby, the side already read by the reading device 30 is facing up. And, to the contrary, the side not yet having been read is facing down in the path 31.

Figure 4:
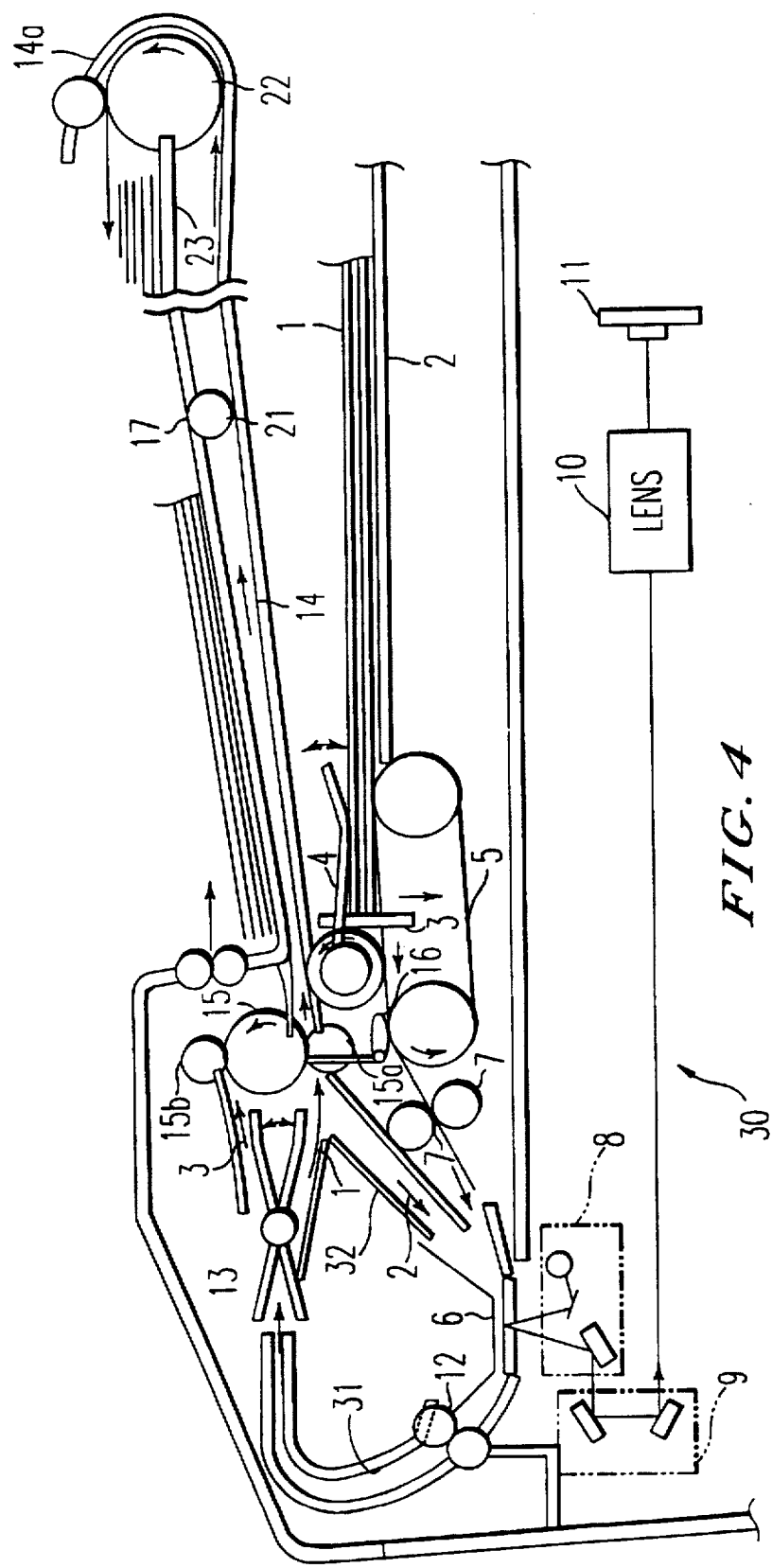
FIG. 4 is a further embodiment of the present invention.

In step S47, the switching lever 13 is swung clockwise so that the entrance to the duplex tray 17 is inhibited as shown in FIG. 4. In step S48 and S49, the document 1 is further fed toward the switch back table 14 by both the reversible roller 15 and the follower roller 15a. The reversible roller 15 is rotated counterclockwise and the duplex document 1 is fed toward the switch-back table 14.

In steps S50 and S51, when the trailing edge of the document 1 is detected by the sensor 16, the reversible roller starts rotating counterclockwise and feeds the document toward the reading position 6 through the switch back return path 32, in the state that the side having been already read is facing up and the side not yet having been read is facing down. After that, in steps S52, S53, the next reading by the reading device 30 for the second side of the document is executed.

In steps S54 and S55, the document having had both sides thereof read is further fed by the ejecting roller 12 upwardly through the path 31. And further, the switching lever 13 is swung counterclockwise so that the document is led between the reversing roller 15 and the follower roller 15b.

In steps S56 and S57, the reversible roller 15 is rotating clockwise and feeds the document to the duplex tray 17. Thereby, the document is stacked on the tray 17 in the state that the first side of the document is facing down, and the documents are stacked in order of the pages thereof.

Obviously, numerous additional modifications and variations of the present invention are possible in light of the above teachings. It is therefore to be understood that within the scope of the appended claims, the present invention may be practiced otherwise than as specifically described herein.

What is claimed as new and is desired to be secured by letters: patent of the United States is:

1. An auto document feeder for an image forming apparatus having an image reading device and an image forming device, comprising:

a document setting tray on which a document having first and second sides is set and which is disposed on the image forming apparatus;

a duplex document receiving tray receiving the document when the document is a duplex document having images formed on both sides thereof and after both sides of the duplex document have been read by the image reading device at a reading position, and which is disposed on the image forming apparatus;

a switch back table on which the duplex document is ejected after having only the first side thereof read and which is disposed between said duplex document receiving tray and said document setting tray;

a reversible roller for directing said duplex document from said switch back table toward said image reading device to have the second side thereof read;

a switching guide for guiding the duplex document either to said duplex document receiving tray or to said switch back table;

an ejecting path for guiding said document after the first side of said duplex document is read, and which extends from the reading position to said switching guide, and having a U-shaped form;

a return straight path for guiding the document from said switch back table to said reading positions a simplex upper receiving tray on which a simplex document having an image formed on only a first side thereof is ejected;

a connecting path through which the simplex document is further fed from said switch back table toward said simplex upper receiving tray, and which is formed in a U-shaped form;

an assisting roller for further feeding the simplex document from said switch back table toward said simplex upper receiving upper tray, and which is disposed on said switch back table.

2. An auto document feeder for image forming apparatus as claimed in claim 1, wherein said simplex document upper receiving tray is disposed at a corner of said duplex document receiving tray.

3. An auto document feeder for image forming apparatus as claimed in claim 1, wherein, a pick-up belt is disposed so that a bottom most document is fed from said document setting tray; and said document is set on said document setting tray in a state that a first page thereof is facing down.

4. An auto document feeder for an image forming apparatus having an image reading device and an image forming device, comprising:

a document setting tray on which a document having first and second sides is set;

a duplex document receiving tray for receiving the document when the document is a duplex document having images formed on both sides thereof and after both sides of the duplex document have been read by the image reading device at a reading position,.and which is disposed on the image forming apparatus;

a switch back table on which the duplex document is ejected after having only the first side thereof read and which is disposed between said document receiving tray and said document setting tray;

a switching guide guiding the duplex document either to said duplex document receiving tray or to said switch back table;

an ejecting path for guiding said duplex document after the first side of said duplex document is read, and which extends from the reading position to said switching guide means and having a U-shaped form; and a reversible roller for directing said duplex document from said switch back table toward said image reading device to have the second side thereof reads;

a simplex upper receiving tray on which a simplex document having an image formed on only a first side thereof is ejected;

a connecting path through which the simplex document is further fed from said switch back table toward said simplex upper receiving tray, and which is formed in a U-shaped form;

an assisting roller for further feeding the simplex document from said switch back table toward said simplex upper receiving upper tray, and which is disposed on said switch back table.

5. An auto document feeder for image forming apparatus as claimed in claim 4, wherein, said simplex document upper receiving tray is disposed at a corner of said duplex document receiving tray.

6. An auto document feeder for image forming apparatus as claimed in claim 4, wherein, a pick-up belt is disposed so that a bottom most document fed from said document setting tray; and said document is set on said document setting tray in a state that first page thereof is facing down.

* * * * *